United States Patent
Blanchard et al.

(10) Patent No.: US 10,045,326 B2
(45) Date of Patent: Aug. 7, 2018

(54) CELL TOWER FUNCTIONALITY WITH SATELLITE ACCESS TO ALLOW A CELL DEVICE TO ROAM ON A SATELLITE NETWORK OR CALL FORWARD ON A SATELLITE NETWORK

(71) Applicant: Globalstar, Inc., Covington, LA (US)

(72) Inventors: Eric Blanchard, Covington, LA (US); Joseph Crowley, Foster City, CA (US); Paul A. Monte, San Jose, CA (US); Prihamdhani Amran, Mandeville, LA (US)

(73) Assignee: Globalstar, Inc., Covington, LA (US)

( * ) Notice: Subject to any disclaimer, the term of this patent is extended or adjusted under 35 U.S.C. 154(b) by 0 days.

(21) Appl. No.: 15/257,547

(22) Filed: Sep. 6, 2016

(65) Prior Publication Data
US 2016/0381657 A1 Dec. 29, 2016

Related U.S. Application Data

(63) Continuation-in-part of application No. PCT/US2015/019182, filed on Mar. 6, 2015.
(Continued)

(51) Int. Cl.
*H04W 4/00* (2018.01)
*H04W 64/00* (2009.01)
(Continued)

(52) U.S. Cl.
CPC ........... *H04W 64/006* (2013.01); *H04W 8/12* (2013.01); *H04W 8/183* (2013.01);
(Continued)

(58) Field of Classification Search
CPC ..... H04W 64/006; H04W 8/12; H04W 8/183; H04W 8/04; H04W 8/06; H04W 84/042; H04W 76/022; H04W 84/047; H04W 4/00
(Continued)

(56) References Cited

U.S. PATENT DOCUMENTS

| 5,303,286 A | 4/1994 | Wiedeman |
| 5,414,432 A | 5/1995 | Penny, Jr. et al. |

(Continued)

FOREIGN PATENT DOCUMENTS

| FR | 2794596 A1 | 12/2000 |
| JP | 2002500493 A | 1/2002 |

(Continued)

OTHER PUBLICATIONS

Lampropoulos, George, et al. "Handover management architectures in integrated WLAN/cellular networks." IEEE Communications Surveys and Tutorials 7.1-4 (2005): 30-44.
(Continued)

*Primary Examiner* — Mong-Thuy Tran
(74) *Attorney, Agent, or Firm* — Jones Walker LLP

(57) ABSTRACT

The system and method to allow a cellular enabled device that lacks two-way satellite communication to receive incoming calls over a satellite network where the mobile terminating call is initially addressed to the cellular mobile phone number. In one embodiment, the system and method allows the cellular device to appear as a device roaming on a satellite network or sub-network. In another embodiment, the system places a call forward request to a satellite enabled device, where the call forward request is transparent to the user.

13 Claims, 3 Drawing Sheets

Related U.S. Application Data

(60) Provisional application No. 61/949,588, filed on Mar. 7, 2014.

(51) Int. Cl.
| | |
|---|---|
| *H04W 8/12* | (2009.01) |
| *H04W 8/18* | (2009.01) |
| *H04W 76/12* | (2018.01) |
| *H04W 24/00* | (2009.01) |
| *H04W 8/04* | (2009.01) |
| *H04W 8/06* | (2009.01) |
| *H04W 76/02* | (2009.01) |
| *H04W 84/04* | (2009.01) |

(52) U.S. Cl.
CPC .......... *H04W 84/042* (2013.01); *H04W 8/04* (2013.01); *H04W 8/06* (2013.01); *H04W 24/00* (2013.01); *H04W 76/022* (2013.01); *H04W 76/12* (2018.02); *H04W 84/047* (2013.01)

(58) Field of Classification Search
USPC .............................. 455/427, 436, 432.1, 433
See application file for complete search history.

(56) References Cited

U.S. PATENT DOCUMENTS

| | | | |
|---|---|---|---|
| 5,490,284 A | 2/1996 | Itoh et al. | |
| 5,504,493 A | 4/1996 | Hirshfield | |
| 5,552,798 A | 9/1996 | Dietrich et al. | |
| 5,581,268 A | 12/1996 | Hirshfield | |
| 5,586,165 A | 12/1996 | Wiedeman | |
| 5,592,481 A | 1/1997 | Wiedeman et al. | |
| 5,619,525 A | 4/1997 | Wiedeman et al. | |
| 5,628,049 A | 5/1997 | Suemitsu | |
| 5,634,190 A | 5/1997 | Wiedeman | |
| 5,640,386 A | 6/1997 | Wiedeman | |
| 5,664,006 A | 9/1997 | Monte et al. | |
| 5,697,050 A | 12/1997 | Wiedeman | |
| 5,732,359 A | 3/1998 | Baranowsky, II et al. | |
| 5,758,260 A | 5/1998 | Wiedeman | |
| 5,758,261 A | 5/1998 | Wiedeman | |
| 5,778,322 A | 7/1998 | Rydbeck | |
| 5,791,598 A | 8/1998 | Rodden et al. | |
| 5,796,760 A | 8/1998 | Wiedeman et al. | |
| 5,802,445 A | 9/1998 | Wiedeman et al. | |
| 5,812,538 A | 9/1998 | Wiedeman et al. | |
| 5,812,932 A | 9/1998 | Wiedeman et al. | |
| 5,859,874 A | 1/1999 | Wiedeman et al. | |
| 5,867,109 A | 2/1999 | Wiedeman | |
| 5,875,180 A | 2/1999 | Wiedeman et al. | |
| 5,884,142 A | 3/1999 | Wiedeman et al. | |
| 5,896,558 A | 4/1999 | Wiedeman | |
| 5,905,943 A | 5/1999 | Wiedeman et al. | |
| 5,912,641 A | 6/1999 | Dietrich | |
| 5,914,675 A | 6/1999 | Tognazzini | |
| 5,918,157 A | 6/1999 | Wiedeman et al. | |
| 5,956,619 A | 9/1999 | Gallagher et al. | |
| 6,072,768 A | 6/2000 | Wiedeman et al. | |
| 6,134,437 A | 10/2000 | Karabinis et al. | |
| 6,529,707 B1 | 3/2003 | Dent | |
| 6,614,769 B1 | 9/2003 | Erlick et al. | |
| 6,661,966 B1 | 12/2003 | Furuyama et al. | |
| 6,711,417 B1 | 3/2004 | Gorman et al. | |
| 7,123,905 B1 * | 10/2006 | Allaway | H04B 7/18508 379/142.08 |
| 7,274,908 B1 | 9/2007 | Boone et al. | |
| 7,463,882 B2 | 12/2008 | Tuomela et al. | |
| 7,667,643 B2 | 2/2010 | Handermann et al. | |
| 7,693,101 B2 | 4/2010 | Gernert et al. | |
| 7,826,868 B2 | 11/2010 | Robbins et al. | |
| 8,620,319 B1 * | 12/2013 | Thandu | H04W 48/02 370/331 |
| 8,676,121 B1 | 3/2014 | Monte et al. | |
| 2002/0019229 A1 * | 2/2002 | Usher | H04B 7/18506 455/435.1 |
| 2003/0104809 A1 | 6/2003 | Godshaw et al. | |
| 2004/0266426 A1 | 12/2004 | Marsh et al. | |
| 2005/0090259 A1 | 4/2005 | Jain et al. | |
| 2006/0025141 A1 | 2/2006 | Marsh et al. | |
| 2006/0116127 A1 * | 6/2006 | Wilhoite | H04M 3/42246 455/442 |
| 2006/0171359 A1 | 8/2006 | Schwarz | |
| 2006/0259416 A1 | 11/2006 | Johnson | |
| 2007/0123252 A1 | 5/2007 | Tronc et al. | |
| 2007/0183440 A1 | 8/2007 | Bennet et al. | |
| 2007/0186251 A1 | 8/2007 | Horowitz et al. | |
| 2007/0206522 A1 | 9/2007 | Starke et al. | |
| 2008/0025249 A1 | 1/2008 | Kuppuswamy et al. | |
| 2008/0167032 A1 * | 7/2008 | Syed | H04B 7/18591 455/427 |
| 2009/0047016 A1 | 2/2009 | Bernard et al. | |
| 2009/0156213 A1 * | 6/2009 | Spinelli | H04W 92/02 455/436 |
| 2009/0168974 A1 | 7/2009 | McCormick | |
| 2009/0180421 A1 | 7/2009 | Hall et al. | |
| 2009/0260004 A1 | 10/2009 | Datta et al. | |
| 2010/0029273 A1 | 2/2010 | Bennett | |
| 2010/0150110 A1 | 6/2010 | Dutta et al. | |
| 2010/0159922 A1 | 6/2010 | Tronc et al. | |
| 2010/0265957 A1 | 10/2010 | Foxworthy et al. | |
| 2011/0046842 A1 | 2/2011 | Smith | |
| 2012/0051405 A1 | 3/2012 | Piesinger | |
| 2012/0149364 A1 | 6/2012 | Leedom, Jr. | |
| 2013/0053095 A1 | 2/2013 | Buckle | |
| 2013/0189975 A1 | 7/2013 | Wyler | |
| 2013/0331096 A1 * | 12/2013 | Rogan | H04W 8/12 455/433 |
| 2014/0071886 A1 | 3/2014 | Monte et al. | |

FOREIGN PATENT DOCUMENTS

| | | |
|---|---|---|
| JP | 2004096265 A | 3/2004 |
| JP | 2007235492 A | 9/2007 |
| WO | 9628947 A1 | 9/1996 |
| WO | 2006094564 A1 | 9/2006 |
| WO | 2012/109269 A1 | 8/2012 |
| WO | 2013/142284 A1 | 9/2013 |

OTHER PUBLICATIONS

Hong, Tae Chul, et al. "Inter-system handover analysis in integrated terrestrial and GEO satellite communication networks for seamless mobility." Advanced Communication Technology, The 9th International Conference on. vol. 1., pp. 717-721. IEEE, 2007.

Corazza, G. E., et al. "Handover procedures in integrated satellite and terrestrial mobile systems." Proceedings of the Third International Mobile Satellite Conference IMSC (1993), p. 143-148.

Baranowsky II, Patrick W. "MSAT and cellular hybrid networking." Proceedings of the Third International Mobile Satellite Conference IMSC (1993), p. 149-154.

Lott, M., et al. "Interworking of WLAN and 3G systems." Communications, IEE Proceedings-. vol. 151. No. 5. IET, 2004.

"Globalstar Launches Satellite Data and Voice Module in the United States." May 29, 2007, Thomasnet News, retrieved on Jul. 3, 2014 from http://news.thomasnet.com/companystory/Globalstar-Launches-Satellite-Data-and-Voice-Module-in-the-United-States-521501.

"Freescale Unveils Embedded VoIP Reference Platform Solution." Oct. 8, 2007, EE Times India, retrieved on Jul. 3, 2014 from http://www.eetindia.co.in/ART_88000482580_1800001_NP_d8a9f35a_HTM.

"iChip Co2144." Feb. 25, 2010, Connect One, retrieved on Jul. 3, 2014 from http://web.archive.org/web/20100225021143/http://www.connectone.com/products.asp?did=40&pid=75.

PCT Application No. US2012/024177; International Search Report for Applicant Globalstar, Inc. dated Jun. 1, 2012.

(56) References Cited

OTHER PUBLICATIONS

PCT Application No. US2013/031746; International Search Report and Written Opinion for Applicant Buckle, et al dated Jun. 7, 2013.

* cited by examiner

CELL TOWER FUNCTIONALITY WITH SATELLITE ACCESS TO ALLOW A CELL DEVICE TO ROAM ON A SATELLITE NETWORK OR CALL FORWARD ON A SATELLITE NETWORK

CROSS-REFERENCE TO RELATED APPLICATIONS

This application is a continuation-in-part of PCT/US2015/019182, filed Mar. 6, 2015, which claimed the priority benefit of U.S. Provisional Application 61/949,588, filed on Mar. 7, 2014. This application incorporates by reference all above applications in their entirety.

BACKGROUND

The prior art teaches an electronic device that has duplex satellite communication ability (e.g., to communicate voice or data over a satellite communications network, such as the Globalstar satellite communication network) where the electronic device also has the capability to interface (by wire or wirelessly, but not over a cellular network) with a cellular enabled device, such as a smart phone, cell enabled tablet, computer or other cellular enabled device. As used, "cell enabled" or "cellular enabled" means that the device can communicate as a mobile device on a cell based communications network. A non-cellular device is a device that cannot communicate as a mobile device on a cell network. The cellular communication functionality does not enable satellite capability, as the communications frequencies for satellites networks are different from cellular communications, and in general, formatting of satellite communications is different from cellular communications (for instance satellite communications can be TDMA or CDMA) and handshaking signaling protocols can be different. The electronic device is designed to allow the cellular device to communicate over a satellite network, by using the electronic device as the conduit or pipe to the satellite network. The cellular enabled device (such as a smart phone or tablet) will have an software application loaded on it for communication with the electronic device (such as using short range WIFI communications for WLAN, or Bluetooth communications (Bluetooth SIG standards) for a PAN. An electronic interface, in conjunction with the electronic device, allows the cellular device, in combination with the electronic device, to function as a duplex satellite communications device. One such prior art device is disclosed in publication "SATELLITE COMMUNICATION DEVICE FOR ROUTING TERRESTRIAL SIGNALS THROUGH A SATELLITE NETWORK", PCT/US2012/024177, publication WO2012/109269, attached and incorporated by reference. That electronic device includes a transceiver for satellite communications, a suitable antenna, an onboard processing and formatting capability. For reference, the electronic device will be referred to herein as an "emulator" or "satellite communications emulator." The emulator allows outgoing calls from the cellular device to be carried over the satellite network. The emulator also allows for the cellular device to receive incoming calls over the satellite network, via the emulator, provided that the calling party or an intermediate network element, knows in advance the emulator's satellite "phone" number or "address" (e.g., the identifier associated with the satellite transceiver in the emulator).

Another prior art device is a system that allows transfer of an ongoing communication, where the communication is through a cell enabled device, between a satellite communications network and a cellular communications network. In general, the distinguishing features of the networks are the radio frequencies, modulation schemes, formatting schemes and handshaking protocols (for instance, for call set up and tear down). This system uses paired SIM cards (Subscriber Identity Module, a smart microprocessor chip for cellular devices, standard, micro or nano etc.) or SIM card equivalent such as a removable user identity module (RUIM), or a UMTS or UICC (Universal Integrated Circuit Card) or a USIM (universal subscriber identity module) all generically referred to as a "SIM card." In this system, one SIM card is resident in the cellular device, and a second SIM card (or equivalent) is located in a remote processing center that contains a "SIM bank," a device that enables multiple SIM cards to interface to the cellular network (e.g., to be located by the cellular system)(the SIM bank could be located across various cells). The SIM bank may be a device for holding multiple hardware SIM cards, or a software SIM embodiment). The system allows an ongoing cellular call (for instance) to automatically transfer to the satellite network (for instance, when cell signal strength degrades) and vice versa. The satellite leg is established in this system using an emulator. The prior art system is described in "Apparatus, method and system for integrating mobile and satellite phone service" PCT/US2013/031746, publication WO2013/142284, attached hereto and incorporated by reference. This system also allows for both incoming and outgoing calls to the cellular device through the satellite communications network. However, one disadvantage of this system is that the SIM card located in the remote cellular device is not the SIM card that is usually associated with the cellular device (the identifier provided by the mobile device's carrier company), but instead, is the paired SIM card. Consequently, the "phone" number or identity associated with the SIM card located on the cellular device is not that number or identity normally associated with the subscriber. The emulator may have its own SIM card or SIM card equivalent or use CDMA/IS-41, to allow authentication/registration of the emulator with the satellite communications system.

SUMMARY OF THE INVENTION

An object of the invention is to allow a mobile device to communicate over a satellite network and to be located using the cellular mobile phone number associated with the cellular device.

In one embodiment, each emulator functions as a cell tower, providing an "access" point for cellular enabled devices, but the access point provided access to via a satellite communications network. While a normal "cell tower" is networked into the standard terrestrial telephone system or internet or public switch telephone network (PSTN), for one of the methods herein, the emulator communicates over a global satellite network (and its associated satellite gateways and/or network operations centers or earth stations), utilizing the Backoffice of the satellite system to route calls from the satellite system to the PSTN or Internet (a packet network). The emulator has satellite modem(s) and/or transceiver(s), each with an associated satellite identifier (e.g., address such as a satellite phone number (that may be stored on a SIM card like device)), and associated processor, antenna, and necessary equipment to place and receive satellite calls over a satellite communications network, as is well known in the prior art. The emulator has the satellite communication capabilities of a satellite phone, but data or voice received from the satellite network is passed through the emulator to the cellular device (call signaling may also pass through the emulator to the cellular device to set up/tear down and connect a communications channel). The emulator also has the equipment and ability to communicate wirelessly over short range radio communications with one or more cellular user devices, such as using standard WIFI communications, to allow the cellular device to pass data/voice over the satellite network via the emulator. The emulator will have a processor and associated equipment and may include the ability to reformat data received/transmitted via short range communications for uplink/downlink communications with the satellites in the satellite communications network (including handling protocol translators) (note the application residing on the cellular device may need similar reformatting and protocol translation ability also). The emulator can have media gateway functionality for interfacing different communications networks. One such emulator is the Sat-Fi satellite hotspot device marketed by Globalstar. In the Sat-Fi, an incoming call cannot be send over the satellite network to the user using the user's cell phone id (telephone number), but is placed using the Sat-Fi satellite identifier (satellite phone number). In the present invention, the emulator may have the ability to place several calls at once (for instance, multiplexing several calls over the same satellite transceiver using packet technology or other multiplexing methods; or by placing each call over a separate transceiver).

In one embodiment, a cellular device (which may be a cell phone, cell modem, computer, tablet, sensor, data logger or other device having the ability to communicate over a cellular network, but the invention is not so limited) will have a software or firmware application installed thereon to allow communications with an emulator. The mobile device will generally contain a visual display, an input device (such as a touchpad), a microphone and a speaker. The cellular device will have the chosen local communications capability with the emulator. When the application on the cellular device is started, the application will seek to locate and connect with a nearby emulator (the preferred communications is standard WIFI communications (IEEE 802.11), Blue Tooth or other short range radio communications can be used with standard interface protocols or handshaking to establish two way communications). For instance, the cellular device may seek out an emulator when cellular signal strength drops below a predetermined level. In some embodiments, the communications between the cellular device and the emulator may be wired communications, such as through an ethernet cable, a USB cable or other wired communications. A number of emulators may operate in the same area, in which event each emulator may use a different radio frequency to reduce interference from another, and each emulator will preferable use handshaking with the registered cellular devices that identifies the emulator.

Several embodiments of the invention also include a Backoffice that has an associated database that can function as a home location register (HLR) and visitor location register (VLR) for the back office (in one embodiment). The Backoffice communicates with a satellite communications network, a PSTN circuit switched network, and/or a packet switched network, to enable the Backoffice to access and communicate, particularly via signaling channels, with other carrier's HLR and with the emulators communicating over the satellite network.

In some embodiments, instances or configurations, the HLR may be referenced as a the home agent or the HSS, and the VLR as the visitor agent. Other nomenclature can be used to reference the databases and functionality of a HLR and VLR. The Backoffice is a computer processing facility that interfaces the PSTN and/or a packet switched network, such as the Internet. The Backoffice may be a included in a satellite gateway and may directly access the satellite network, as opposed to routing calls to the satellite network over the PSTN or through the Internet. In one embodiment the Backoffice may have an associated SIM bank with stored SIM cards or SIM card equivalents.

DETAILED DESCRIPTION OF THE INVENTION

Figure 1:
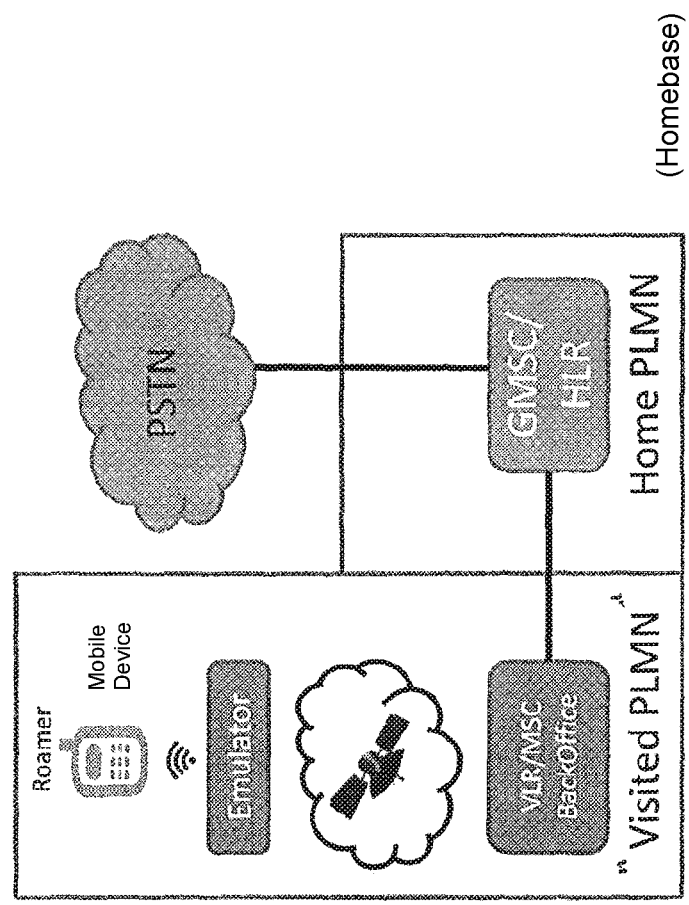
FIG. 1 is a block schematic diagram of the base architecture of a GMS network with the Backoffice as the visitor MSC.

To interface with an emulator, a cellular device "registers" with one emulator, and that emulator will initially handle the interfacing of that cellular device to the satellite communications system. Each emulator may have a series of cellular devices registered with that particular emulator. The cellular device, for instance, may identify several emulators nearby, and request registration with the emulator having the strongest signal (such as WIFI or other short range radio signal), or may register with the emulator first responding to the request to register. Other schemes may be used to select an emulator for several available (for instance, the emulators may communicate with each other and have a protocol or procedure for selection).

Cellular Mobile Device Emulator Registration

The "emulator registration" process results in the "subscriber" being identified as a roaming cellular device, where the mobile device is "roaming" on the emulator as the base transceiver station (BTS) (the functions of the base station controller (BSC) needed for a typical cellular access point will generally be carried out by the emulator, but some functionality may be shared with the Backoffice) and the Backoffice functioning as the visitor MSC (in a 2G embodiment). To register, the application on the mobile device will establish communications with a nearby emulator, and pass subscriber information to the emulator for transmission to the Backoffice. The emulator transmits the subscriber information as well as a unique emulator identifier via the satellite network to the Backoffice. The subscriber information can include the information normally contained on the mobile device's SIM card, such as integrated circuit card identifier (ICCID), international mobile subscriber identity (IMSI) (generally used by the HLR to index into the database), Authentication Key (Ki), and may include carrier-specific data such as the SMSC (Short Message Service Center) number, Service Provider Name (SPN) and Service Dialing Numbers (SDN) and Mobile Station ISDN number (MSISDN (the "phone number"). The Backoffice receives the subscriber cellular device information and emulator information and stores it on a database, associating the particular subscriber with the relevant emulator. The Backoffice is a processing data center with associated databases, and communicates with the PSTN, the satellite communication network (either through a gateway or through a gateway via PSTN) and may also communicate with the cellular networks. The cellular device is then registered with the Backoffice, and is associated or "located" or "present" {at specified emulator. The Backoffice can recognize the registration process generally acts as a request to communicate over the satellite network through the emulator; however registration can be a separate function from a request to active the services (e.g., request communication service over the satellite network via the emulator).

Registration as a Roaming Device—Location Update

The following first describes one embodiment of the system in a 2G type of environment. In one embodiment, when the service is activated, that subscriber cellular device will appear to the communications network as "roaming" or "visiting" on the emulator/Backoffice. In essence, the Backoffice will appear to be a visited "cellular network" MCS (in a 2G environment) on which the remote cellular device is located or present. Roaming agreements will need to be in place with the various carriers.

To establish the device as a roaming device in a 2G (GMS) environment, the Backoffice will inform the home HLR of the cellular device of the presence of the cellular device on the "Backoffice" network. This communication with the subscriber's home network will generally be over signal channels via the PSTN or packet network. The Backoffice (acting as a visited network MSC) contacts the cellular devices home network and requests service information (including whether or not the mobile should be allowed to roam), generally using the mobile phone number or international mobile subscriber identity (IMSI) number of the user's cellular device. If successful, the visited network (the emulator/Backoffice, functioning as a BST and a visited mobile switching center or MSC) begins to maintain a temporary subscriber record for the "roaming" cellular device in the Backoffice database (functioning as a visitor location registry). Likewise, the home network of the subscriber updates its information in the home location register (HLR) or home network register (HNR) to indicate that the cellular device is located on the visited network (the emulator/Backoffice) so that any information sent to that mobile cellular device can be correctly routed, as next described, to the emulator (via a satellite communication) and then to the cellular device. In order that a subscriber is able to register on to a visited network (e.g., Backoffice), a roaming agreement needs to be in place between the visited network (the Backoffice) and the home network. The general component configuration of a GSM "2G" type of network, with the Backoffice operating as the visited MSC, is shown in FIG. 1.

Incoming Calls to the Mobile Device with Service Activated

The "visiting" subscriber acquires an entry in a subscriber database of the visited network (e.g., the Backoffice database, functioning like a Visited Network Location Register) and an entry in the cellular devices HLR or home agent, that indicates that the subscriber (the mobile device) is roaming or present on the Backoffice "network" MSC. If an incoming call is now placed to the cellular device, the mobile cellular device's home MSC (sometimes referred to as the gateway MSC or GMSC) will check its associated HLR to locate the cellular device. As indicated above, the HLR points to the Backoffice. The home network MSC/HLR (over signal channels generally via PSTN) will request a mobile station roaming number (MSRN) (2G) or a IP address (3G data) for the cellular device. In one embodiment, the Backoffice may dynamically assign or allocate a temporary directory number (or IP address for 3G) and may also assign an international mobile subscriber identity (IMSI). In one embodiment, the Backoffice will allocate or assign one of the SIM cards stored in the SIM bank and use the identifiers associated with the selected SIM card. In another embodiment, the Backoffice dynamically assigns a mobile station routing number (MSRN)(2G or 3G voice (non IMS)) or IP address (3G data) from a database of available MSRNs or IP addresses (a SIM card or SIM Bank is not required in this embodiment). Note that for 3G IMS voice, there is no need to request an IP address as the home network will maintain the cellular device information, including the IP address assigned when registering at the Backoffice via PDP context. The Backoffice will notify the cellular device's home network HLR of this temporary routing number as the mobile station routing number (the MSRN), or the Routing IP address (obtained in a PDP context)(both considered a temporary routing number). The temporary routing number may be assigned by the visited network (e.g., the Backoffice) upon initial registration, or it may be assigned on a per call basis (as described above). In the latter case, the temporary routing number has to be requested by the home network HLR for each incoming call before it can route the call to the visitor network.

This temporary routing number may be maintained by the subscriber's home MSC location register for a period of time, or eliminated after the call/communication is complete. Both the Backoffice and the subscribers' home network will undertake accounting functions with the cell number (e.g., Backoffice will make sure the cellular device is a subscriber to the service) and the subscriber's home network will make sure the cellular device is in its system and has routing or roaming privileges to the Backoffice. The Backoffice functions as the visited network mobile switching center. The assigned temporary routing number will route the incoming call to the satellite network via the suitable satellite gateway that is servicing the emulator.

For instance, each emulator has a home satellite gateway, and the home gateway keeps a visitor gateway identifier to identify the actual satellite gateway that will service satellite communications to the emulator. The servicing satellite gateway may be the home gateway or another satellite gateway. Consequently, the temporary MSRN assigned by the Backoffice and sent to the cellular devices HLR should point to the satellite gateway servicing the emulator. The assignment of an MSRN for a servicing gateway will preferably be handled by the satellite Backoffice.

At this point, for the incoming call, the cell device's home HLR will forward the temporary routing number to the cell devices' home network MSC, and the home network MSC will use the temporary routing number to route the incoming call to the visitor network (e.g., to the emulator servicing satellite gateway). Location management (mobility management) and call set up are established though control or signaling channels, while the call circuit is generally physically established when off hook condition is present at the mobile cellular device. That is, control signaling is undertaken between the calling party's home network (the Backoffice may be involved if temporary routing number is established at the time of a call), the emulator and the cellular device to set up the call between the calling party and the called mobile device. The communications channels through the network are reserved in a 2G environment, waiting for off hook condition at the cellular device. When this condition is established, the communication path is set up between the calling party and called party, through the satellite network to the emulator and then to the cellular device preferably over an air interface (short range radio communications. In a 3G environment, data communications can be via SIP protocol, FTP, HTTP or other protocol, while voice communications can be handled by switched circuits or IMS or VOIP communications.

If the particular emulator has several assigned satellite numbers, the Backoffice will pick a number that is available (e.g., not tied up on another call), or if a multiplexing scheme is in use, the scheme will be employed to multiplex the new incoming call for delivery to the emulator via the satellite communications network. On receipt by the emulator, the emulator also receives the called cellular device number or identifier (via control signaling), and can identify the proper cellular device to which to direct the call. The emulator, if servicing more than one cellular device, will route the incoming communication to the proper addressed cellular device. The emulator is acting much like a bent pipe system for an incoming call once the communications channel is established, but includes the ability to process the incoming communication data for reformatting if necessary for communications over the emulator air interface or hard wired communications to the cell device. To set up the communications channel, the emulator will notify the proper cellular device (such as over the WIFI connection) of an incoming call (including providing calling party identifying information (e.g., caller id)) and if the cellular device responds (goes "off hook"), the circuit from the calling party through the satellite to the emulator to the cellular device will be established.

One Embodiment of Signaling for Call Set Up in a GSM Environment (Call Terminating at a Mobile Device)

1. The calling party (such as from within the public telephone network) dials the mobile subscriber's MSISDN (the telephone number) of the roaming cellular device.
2. Based on the information contained in the MSISDN (including the national destination code and the country code), the call is routed to the mobile switching center (MSC) of the mobile network gateway (GMSC). It is done generally with an IAM (Initial Address Message).
3. To locate the mobile station, the GMSC sends to the HLR a SRI (Send Routing Information) message. The SRI message contains the MSISDN number and with this MSISDN the HLR will obtain the IMSI.
4. Because of prior notification from the Backoffice, the HLR knows the VLR (i.e. the Backoffice) that currently "serves" the subscriber. The HLR will send to the VLR a PRN (Provide Roaming Number) message to obtain the MSRN of the roaming cellular device for routing of the incoming call.
5. With the IMSI contained in the PRN message, the VLR (Backoffice) assigns a SIM card and its associated identifiers as the mobile station roaming number. This MSRN number is sent back to the HLR in a RIA (Routing Information Acknowledgement) message.
6. Now with the MSRN number, the GMSC knows how to route the call to reach the roaming cellular device. Then, the call is made using signaling between the GMSC and the visited MSC (the Backoffice). The GMSC will generate an IAM message with the MSRN as the called party number (and NOT the MSISDN as the called party number).
7. When the Backoffice (the visitor network) receives the IAM, it recognizes the MSRN and knows the cellular device and the emulator serving that cellular device (by checking its database), and sends routing information to the home base to route the incoming call to the servicing satellite gateway of the emulator for delivery to the emulator and finally, from the emulator to the associated cellular device.
8. When the call is terminated, the Backoffice returns the MSRN to the Backoffice pool for future use on another call.

In one embodiment, the Backoffice may send as the MSRN the identification of the emulator. That is, the Backoffice sends routing information so that the call can be routed from the calling party, through the PSTN, to the satellite gateway that is servicing the emulator.

The emulator can also function as a local network or PBX, to route calls from one cellular device registered with that emulator to another cellular device registered with the emulator. In this instance, the call does not need to be routed over the satellite network, but can be handled through the emulator alone. In this embodiment, the emulator may have its own database of subscribers to track registered subscribers, or the emulator may obtain this information from the Backoffice of signaling channels. Preferably, as long the emulator service is enabled, the Backoffice will periodically notify the cellular device's home network that the cellular device remains "present" on the Backoffice visited network.

The advantage of this system is that the SIM card resident on the cellular device is the cellular device SIM assigned by the home network: a foreign SIM card is not resident on the cellular device. As described, the SIM bank can also be replaced with a logical digital database of temporary routing numbers; physical SIM cards, and a SIM card bank are not required.

Use in a 3G Environment is similar, with an added complexity that packet core networks (a "packet network") are used for data communications instead of a circuit switched network, including the serving gateway GPRS support node (SGSN) and the gateway GPRS support node (GGSN). Additionally, the circuit core network can be replaced, in some instances, with an IMS (Internet Multimedia Subsystem) core network consisting primarily of the CSCF and HSS. One embodiment of 3G roaming functionality using the emulator is as follows.

3G Inbound Roaming Subscriber—Data Communications

Figure 2:
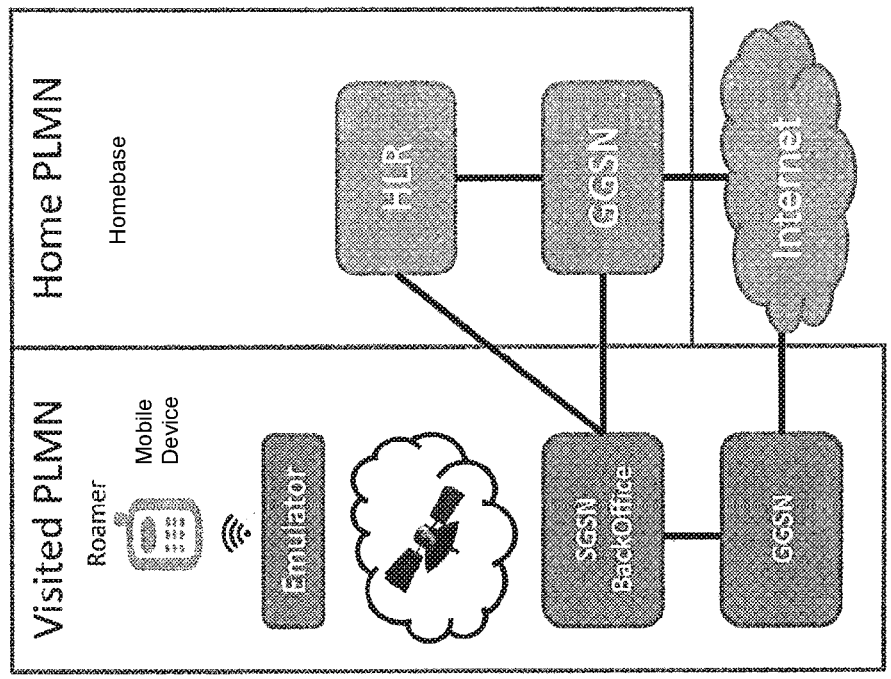
FIG. 2 is a block schematic diagram of the base architecture of a GPRS network with the Backoffice as the Serving GSN.
Figure 4:
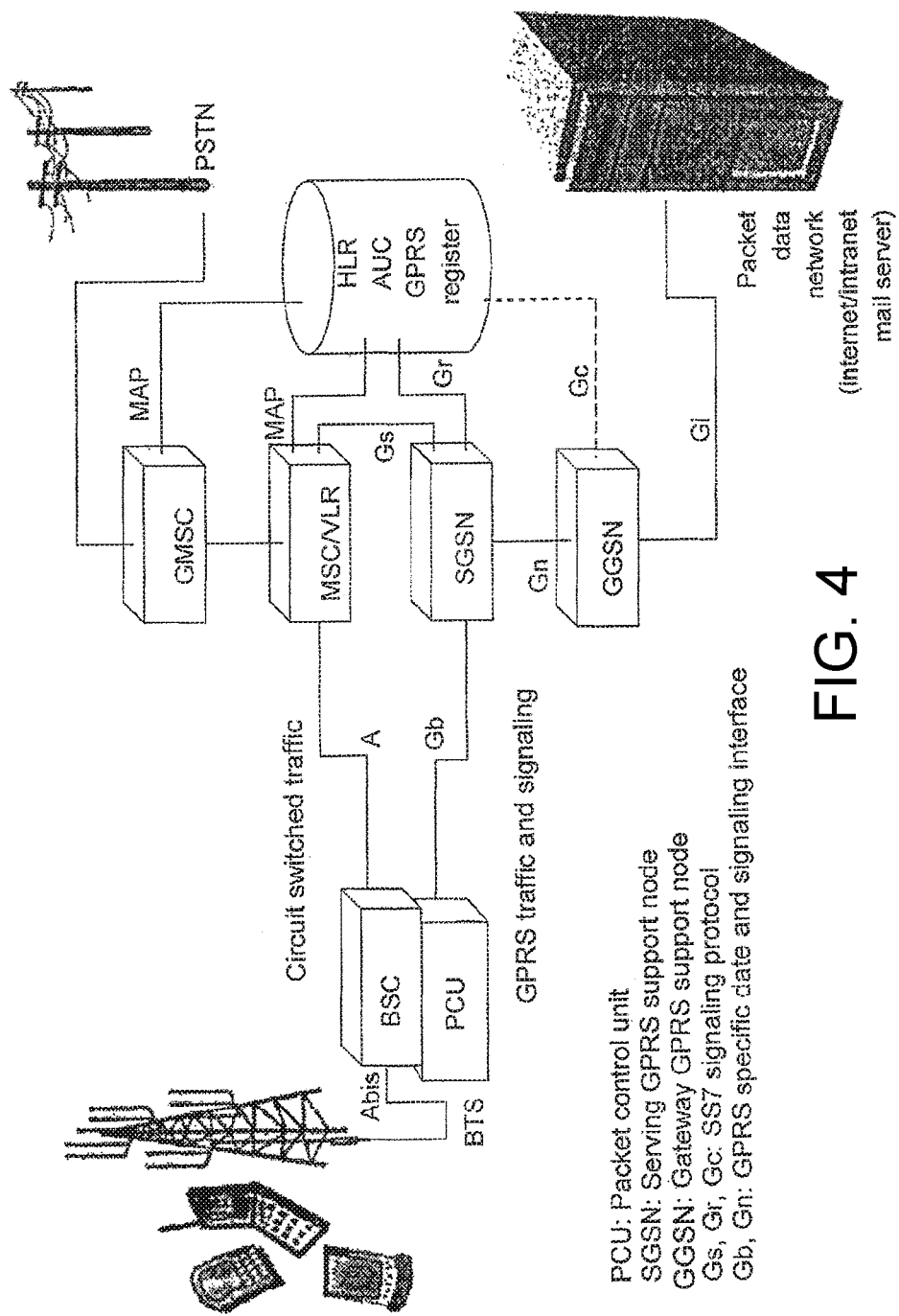
FIG. 4 is a block diagram of the base architecture of a GPRS packet switched data and circuit switched voice communications.

The 3G core network (also referred to as Universal Mobile Telecommunications System or UMTS) has two primary core components: the packet core (SGSN and GGSN) used for data communications, and the voice components (which can be packet core switched). A diagram of the 3G core network (GPRS) network of the packet switched side is shown in FIG. 2, where the Backoffice functions as the visited SGSN. In certain 3G environments, the network can maintain voice communications over a circuit switched network and the circuit core (MSC/VLR) used for voice call management. This combined functionality is depicted in FIG. 4.

Location management (pack core registration) for a packet network generally consists of GPRS attach. Communications or call set up generally is initiated by a packet data protocol context (PDP Context).

GPRS Attach Procedure (Registration or Location) Signaling in Abbreviated Form

The Mobile device sends GPRS attach request with its identity to the visited SGSN (e.g., transmissions via the emulator to the Backoffice over the satellite communication). The Backoffice sends authentication to the GGSN Home HLR of the mobile device (MAP protocol can be used) and on successful authentication, the Backoffice sends "Update GPRS Location" to the Home HLR.

Home HLR responds with "Insert Subscriber Data". The message consists of the GPRS subscription data for PDP context.

Both visited SGSN (the Backoffice) and Home HLR respond to each other with acknowledgements.

Visited SGSN (Backoffice) sends "Attach accept" to the mobile device via the emulator which responds with "Attach complete".

At this point, the HLR knows that the mobile device is "roaming" on the Backoffice as the visited SGSN. The SGSN may also update the location of the mobile device at the MDC-VLR, if IMS (packet switched) voice communications are not used.

PDP Context procedure (provide temporary routing number (IP address) signaling for communications in abbreviated format):

The Mobile device (sometimes referred to as a user agent, or UA) or a PDP network (for a MS terminated communication) sends "Activate PDP context" request to the Visited SGSN (the Backoffice)

The Backoffice, acting as both visited SGSN and visited GGSN) responds with the "Activate PDP context Accept" to the mobile device (all occurring over the satellite network to the emulator, to the mobile device). The message includes the assigned Backoffice P-CSCF IP address.

The mobile device or emulator saves the P-CSCF IP address,

SIP communications for voice are now possible with the mobile device with the IP address of the P-CSCF. SIP data communications (such as FTP, or HTTP) are also enabled by an IP address assigned during PDP context.

Activating a PDP address sets up an association between the terminal's current SGSN (the Backoffice) and the GGSN that anchors the PDP address. A record is kept regarding the associations made between the GGSN and SGSN. This record is known as a PDP context. PDP context can be initiated by the mobile device, or an incoming request from a packet data network.

Figure 3:
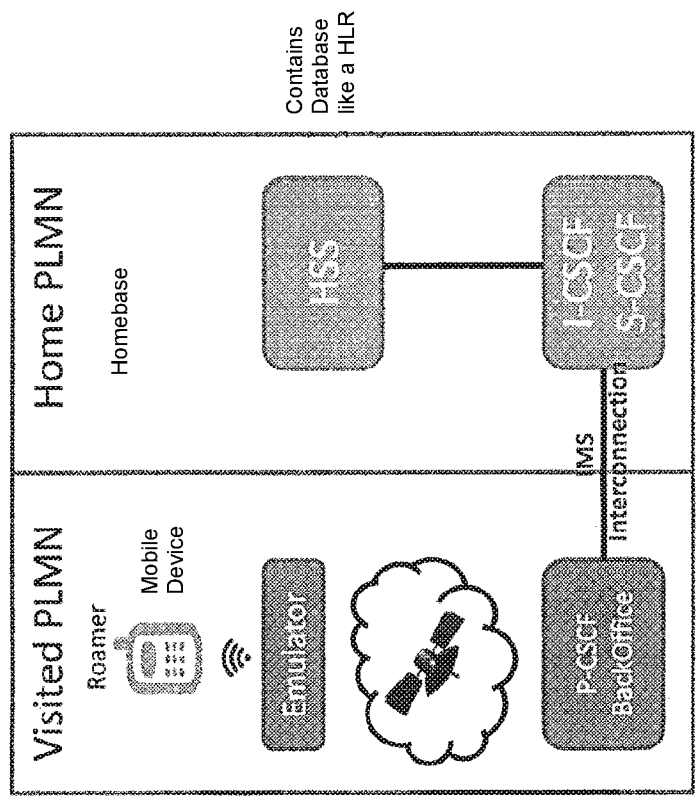
FIG. 3 is a block schematic diagram of the base architecture for IMS voice packet communications, with the Backoffice as the visited P-SCSF.

In a 3G telecommunication core network, the voice circuit switched core is often replaced with the IMS core network, which includes the CSCF (call session control function) (server computers) and HSS (home subscriber server). In general, the CSCF consists of 3 main components: P-CSCF (Proxy), S-CSCF (serving) and I-CSCF (interrogating). The architecture of an IMS core network is shown in FIG. 3, with the Backoffice acting as the proxy CSCF.

For an IMS interconnection, the P-CSCF contains a database (similar to the VLR) on the visited public land mobile network (PLMN), while the HSS contains a database of the subscriber information, much like a HLR.

When IMS voice service is present, location management (Registration) signaling is as follows in abbreviated overview:

IMS Registration (for Mobile Initiated)
  Mobile device starts a connection to the P-CSCF that belongs to the IMS visited domain (that is different than its home domain).
  mobile device sends SIP register message to the visited P-CSCF (the Backoffice)
  Backoffice will resolve the request URI home domain (using DNS query) to get the IP address of the Mobile device's home I-CSCF Mobile device authentication request, the visited P-CSCF forwards the SIP register message to the Home I-CSCF of the UE's home domain
  Home I-CSCF sends "User Authorization Request" to the home Home Subscriber Server (HSS)
  Home HSS responds with "User Authorization Answer". The message includes the address of Home S-CSCF
  Home I-CSCF forwards SIP register to the home S-CSCF
  Home S-CSCF performs authentication to the home HSS by sending "Multimedia Authentication Request"
  Home HSS answers with a set of authentication keys.
  Upon receiving the keys, the home S-CSCF will forward the keys all the way back to the mobile device (and the back office) inside the "401 Unauthorized" message
  The mobile device will use the keys to calculate the authentication algorithm
  The mobile device resends the SIP register back to the home S-CSCF along with the authentication value
  Home S-CSCF sends "Server Assignment Request" to the HSS
  Upon receiving the answer from HSS, the home S-CSCF will compare the authentication value from the mobile device
  If the value matches, the S-CSCF will send "200 OK" all the way back to the UA to indicate that the mobile device has been registered.
  Note: The S-CSCF is seen as the registrar for the network, although the HSS holds the data against which the S-CSCF checks the authenticity of the subscriber requesting entry.

IMS Set Up for an Incoming Communications (Mobile Terminated Communications)
  The mobile device's home IMS receives a call request to the mobile device (i.e. Home Media gateway control function (MGCF) receives ISUP IAM)
  Home MGCF sends "terminating" INVITE request to the home I-CSCF
  Home I-CSCF sends "Location Info Request" to home HSS (the home location registry will have the data)
E.g., The I-CSCF interrogates the HSS to obtain the address of the relevant S-CSCF to process the SIP initiation request.
  The home S-CSCF forwards the INVITE message to the Visited P-CSCF (Backoffice) that was recorded at the time of the registration
  The visited P-CSCF forwards INVITE to the roaming mobile device via the emulator.

When the user disconnects from the emulator service, if the cellular device is located in a cell network, that cell network may then inform the cellular device's home network that the cellular device is now "present" or roaming in that particular cell (in, for instance, a new visited network) and the cellular device's HLR is updated accordingly so that calls will be routed over the cell network instead of through the emulator/satellite communications network.

In use, when the emulator service is activated, the software application on the cellular device may disable the cellular device from registering or sending registration requests to cell base stations (other than to the emulator over an air interface (WIFI or other short range wireless communications). This will prevent possible ambiguities of the location of the cellular device—it will always be located in the emulator/Backoffice network as long as the emulator service is active. The cellular device would still have the ability to monitor signal strengths of nearby cell towers, and if signal strength is sufficient, the application on the cell may discontinue the emulator satellite service (sending notification to the Backoffice of termination of service). The application may be structured to restart emulator communications if cellular signal strength falls below a predetermined level.

Alternatively, the application software could be configured to select one service or the other, or to allow automated mode switching between the cellular and satellite networks in a controlled fashion, in such a way as to prevent possible ambiguities.

In the above sequences, the Backoffice notifies the relevant HLR (associated with the Home network MCS or home network GGSN or HSS) of the "location" or presence of the mobile device on the Backoffice as a visited network. Once the location of the mobile device is known to the network (via HLR), for an incoming call, the home HLR is queried for the location of the mobile device. The HLR then points to the Backoffice, and the HLR will either contain or request a temporary routing number from the Backoffice. That temporary routing number is provided to the HLR for routing of the call or packets to the proper gateway servicing the emulator.

Outgoing Communications (Mobile Originated)

An outgoing call (mobile originated call) is handled somewhat similarly. The mobile user dials an outgoing call (or tries to send data to an IP address), which the application on the mobile device communicates to the emulator over the air link. The emulator notifies the Backoffice via the communications satellite of the request to place a call or data communications. The Backoffice will signal over the circuit switched network or the packet network to the called party's HLR for a location of the called party (assuming the called party is a mobile device), and the standard location management and call set up procedures usually followed by the network are undertaken with the Backoffice as the visited MSC or SGSN, to route the outgoing call through the servicing satellite gateway to the PSTN or Internet to connect the mobile device, to the desired termination location.

This same functionality can be used with a mobile device that has both cell and satellite functionality (for instance, a dual configured mobile device). With an integrated device, having two identities (a satellite identity and a cellular identity), the user can be reached over either network using only one of the identities (for instance, the user can give out only the cellular number). The user can then control which network should be used for incoming calls (satellite or cellular) by activating or deactivating an application on the device that will register the device with the Backoffice and allow the HLR to point to the Backoffice. For an integrated device, the emulator is not needed as the integrated device has the satellite phone functionality.

Alternative Implementations:
 1. Instead of identifying itself as a "visited cellular network," the emulator Backoffice could use Call Forward functions to route calls terminating at the mobile device through the emulator. In this configuration, when the emulator Backoffice receives the registration information from the emulator, or the request to active emulator service, the emulator Backoffice uses standard cellular signaling commands to send Call Forward requests (such as Unconditional call forward) to the home HLR of the cellular device. The call forward request would include the call forward routing number (the temporary routing number), such as either a Backoffice assigned routing number that is associated with the emulator and/or the emulator servicing satellite gateway, or a MSRN, phone number or IMSI number (such as provided by the emulator when the subscriber registers the mobile device for satellite service). That is, the Backoffice (for instance, at mobile device registration), notifies the mobile device home network that calls to the mobile device are to be forwarded to a temporary routing address (e.g., MSRN or emulator identifier or address, such as phone number (MSISDN) or IMSI, or IP address) associated with the emulator. The temporary routing number can be a number associated with the servicing satellite gateway (the visited satellite gateway) or can be a number assigned to the emulator (MSISDN, phone number etc.). Mobile terminate calls will be call forwarded to the routing number held in the mobile's home HLR, and usual location management, call the satellite communications system will be responsible for routing communications to the emulator (generally via the satellite gateway VLR and HLR associated with the emulator). For instance, the emulator home satellite gateway's HLR points to the servicing satellite gateway. A call directed to the mobile will be redirected (call forwarded) to the call forward routing address, and the emulator home satellite gateway (in conjunction with the Backoffice) will undertake location management of the emulator, and routing of the redirected call will proceed as a call forward to a satellite phone. Note, the Backoffice may provide a temporary routing number for the emulator as a call forward number at time of either registration or service activation. The emulator call forward routing address may be provided by the emulator itself (such as during mobile device registration for the service) or the Backoffice may provide a corresponding emulator address by associating or mapping an address with the emulator. For instance, the Backoffice may send an address associated with the serving satellite gateway as a call forward address, and sending notification of the assigned call forward number and emulator address to the serving satellite gateway, so the serving satellite gateway can route the communication incoming to the serving gateway to the emulator address provided by the Backoffice. The emulator/Backoffice may reset the CFU (Call Forward Unconditional destination phone number) of the cellular device subscription to its default either when the cellular device de-registers from the emulator, or when the cellular device has been unresponsive to emulator communications for a defined period of time. The advantage of the CFU approach is that it does not require any roaming agreements with other phone networks. The CFU can be implemented automatically as described, or the user can configure call forwarding manually (or the application on the phone can be configured to accomplish this.

In the call forwarding embodiment, the call forwarding request is transparent to the user/subscriber, that is, the user does not know the call forward number being associated with her mobile cellular device, or that call forward has been activated. The user/subscriber only knows that she can receive incoming calls from a third party, where the third party's communications are addressed to the MSISDN or phone number of the mobile device (that is, the system is transparent to a third party also).
 2. As described above for call forwarding, but the user device does not have to be a cellular device. It can be a wired device or a wireless device not associated with cellular networks, but which has been assigned a phone number, a pseudo phone number or other satellite address (either temporary or permanent) by the emulator Backoffice and its associated HLR.

3. Same as the general description of the services in the detailed description of the invention, but the application software that interfaces to the emulator is actually in a separate standalone interface device, such as a tablet or additional cellular device. In the description listed above, wherever "cellular device" is mentioned, substitute "user device interface unit." An alternative here is that when the user downloads the application, the application has the user register its hardware which allows the application software to know the identity of the user's equipment, be it cell device, computer, or tablet.

4. As a modification of the roaming solution, the Backoffice can assign multiple identities to a single subscription. In this way, the Backoffice can keep track of the multiple services or multiple peripherals attached to a single device on the emulator for mobile terminated communications.

An additional function that all of these solutions can provide is for insertion of the originating caller identity so that when a user initiates a call from within the emulator network, their cell phone subscriber identity shows up on the caller ID and not the satellite subscription identity of the emulator. This functionality ("caller id spoofing") can be provided by the emulator or Backoffice.

In a 2G or 3G environment, there is a home base or home network that contains a database where the "location" of the mobile device is maintained. For 2G, the home network includes the home MSC and the associated Home Location Register; for a 3G environment, the home network includes the an HLR associated with the home GGSN, and for IMS, the Home network includes the home S-CSCF and I-CSC, and a database associated with the HSS. To generically refer to both 2G and 3G environments, the term "home base" will be used for the home network components, and "home registry" or "visitor registry" will reference the associated databases for a visitor network or a home network, such as the HLR, associated with a home MSC or home GGSN, or the database associated with the HSS. A "call" as used can be either voice or data communications, and the voice communication can include switched circuit calls or packet calls, such as VOIP or IMS communications.

As described, the techniques include the capability for a cell device to communicate over a satellite network, and to addressed for mobile terminating calls by use of the cell phone number. The third party trying to reach the cellular device does not need to know the satellite phone number of the emulator, but only needs to know the cell phone number of the mobile cellular device that the third party is trying to reach. The fact that the satellite network is being used to route calls to the cell device is completely transparent to the third party caller.

As described, a Backoffice is used, but more than one Backoffice can be employed. Each satellite gateway can be associated with a single Backoffice, or several satellite gateways can coordinate traffic with a single Backoffice. As used, a cellular enabled device or a cell device is a device that is designed to communicate with/to a cellular base transmitter mobile base station in a mobile communications network (public land mobile radio, PLMR, or public land mobile network PLMN, or even a non-public private network, such as a military only network, such as a defense switched network, or a defense packet network).

The emulator appears to the satellite system Backoffice as a satellite phone (hence, the nomenclature of "emulator." However, the emulator, to a user, is not a phone, it generally lacks a microphone and speaker as would be necessary in a true cellular or satellite phone. The emulator may induce an input device (such as a virtual or real keyboard) and a display device to allow a user to configure the emulator as needed for a particular application.

The invention claimed is:

1. A method of roaming in a system comprising a mobile cellular enabled device that has an associated home base comprising a home location registry, said mobile cellular enabled device further comprising a short range non-cellular radio transceiver;
    a satellite communications emulator that comprises an antenna, a transceiver for two way communications over a satellite communications network, said satellite communications emulator further comprising a short range non-cellular radio transceiver for communication with a mobile cellular enabled device, said satellite communications emulator associated with a home gateway comprising a gateway registry;
    a Backoffice comprising a processor and database, said Backoffice capable of communication with said satellite communications network and a public switched telephone network or a packet network;
    the method comprising the steps of:
        the Backoffice processor receiving a communication from said mobile cellular enabled device through the satellite communications emulator, a satellite and a serving satellite gateway, requesting communication service through said satellite communications emulator;
        said Backoffice associating said satellite communications emulator with said mobile cellular enabled device in said Backoffice database;
        said Backoffice sending notification to said mobile cellular enabled device's home location registry of the status of said mobile cellular enabled device as a roaming device on said Backoffice, said Backoffice further sending a temporary mobile station routing number or a temporary internet protocol (IP) address associated with said satellite communications emulator, to said mobile cellular enabled device's associated home base for routing of incoming calls to said mobile cellular enabled device through said satellite communications emulator.

2. The method of claim 1 further comprising the steps of said Backoffice receiving identification of said servicing satellite gateway of said satellite communications emulator from said satellite communications emulator home registry.

3. The method of claim 1 further comprising the steps of establishing an incoming call to said mobile cellular enabled device, where said incoming call is routed by said mobile cellular enabled device's associated home base using said temporary mobile station routing number or said temporary IP address received from said Backoffice.

4. The method of claim 3 wherein said steps of establishing an incoming call comprises the steps of said Backoffice receiving a first request for routing a communications to said mobile cellular enabled device from said home base of said mobile cellular enabled device; and
    said Backoffice sending said temporary mobile station routing number or said temporary IP address to said associated home base of said mobile cellular enabled device when said mobile cellular enabled device registers with the Backoffice, or at the time of an incoming call to said mobile cellular enabled device.

5. A method of forwarding calls to a cellular enabled device in a system comprising said cellular enabled device having an associated home base comprising a home location registry, said cellular enabled device further comprising a short range non-cellular radio transceiver;
> a satellite communications emulator that comprises an antenna, a transceiver for two way communications over a satellite communications network comprising satellites and satellite gateways, said satellite communications emulator further comprising a short range non-cellular radio transceiver for communication with said cellular enabled device;
> a Backoffice comprising a processor and associated databases, said Backoffice in communications with said satellite communications network and a public switched telephone network or a packet network;

the method comprising the steps of:
> the Backoffice processor receiving a communication from said cellular enabled device to communicate through said satellite communications emulator, said communication through said satellite communications emulator, one of said satellites and one of said satellite gateways, said one of said satellite gateways servicing said one of said satellites comprising a serving satellite gateway;
> said Backoffice determining a routing number for communications with said satellite communications emulator over said satellite communications network;
> said Backoffice sending an unconditional call forward request to said associated home base of said cellular enabled device, said unconditional call forwarding request including said routing number.

6. The method of claim 5 wherein said routing number is a temporary mobile station routing number or a temporary internet protocol (IP) address associated with said satellite communications emulator.

7. The method of claim 5 wherein said routing number is a Mobile Station International Subscriber Directory Number (MSISDN) or an internet address of said satellite communications emulator.

8. The method of claim 7 wherein said MSISDN or internet address is provided by said satellite communications emulator to said Backoffice.

9. A method of establishing a cellular device terminating call over a satellite network in a system comprising a cellular enabled device that has an associated home base comprising a home location registry, said cellular enabled device further having an associated telephone number, said cellular enabled device further comprising a short range non-cellular radio transceiver;
> a satellite communications emulator that comprises an antenna, a transceiver for two way communications to a satellite in a satellite communications network comprising satellites and satellite gateways, said satellite communications emulator further comprising a short range non-cellular radio transceiver for communication with said cellular enabled device, said satellite communications emulator associated with a home satellite gateway comprising a gateway registry;
> a Backoffice comprising a processor and database, said Backoffice in communication with said satellite communications network and a public switched telephone network or a packet network;

the method comprising the steps of:
> receiving a request at the Backoffice for a cellular device terminating call to said cellular enabled device, said request including either the cellular enabled device's Mobile Station International Subscriber Directory Number (MSISDN) or an internet protocol (IP) address of said cellular enabled device, but said request lacking said satellite communications emulator's address or identification information;
> identifying said satellite communications emulator associated with said cellular enabled device and identifying a temporary routing address associated with said satellite communications emulator for communications over a satellite gateway serving said satellite communications emulator;
> transmitting said temporary routing address to said associated home base of said cellular enabled device for call routing;
> routing said cellular device terminating call through said servicing satellite gateway to said satellite to said satellite communications emulator, using said temporary routing number;
> said satellite communications emulator further routing said cellular device terminating call to said cellular enabled device over said non-cellular short range transceiver in said satellite communications emulator.

10. The method of claim 9 wherein said Backoffice assists in performing the step of identifying a temporary routing address for said satellite communications emulator.

11. The method of claim 9 wherein said associated home base of said cellular enabled device performs a step of retrieving said temporary routing number to said satellite communications emulator.

12. The method of claim 11 wherein said temporary routing number is sent to the home location registry for routing of said cellular device terminating call.

13. A system comprising mobile cellular enabled device that has an associated home base comprising a home location registry, said mobile cellular enabled device further comprising a short range non-cellular radio transceiver;
> a satellite communications emulator that comprises an antenna, a transceiver for two way communications over a satellite communications network comprising satellites and satellite gateways, said emulator further comprising a short range non-cellular radio transceiver for communication with a mobile cellular device, said satellite communications emulator associated with a home gateway comprising a gateway registry;
> a Backoffice comprising a processor and database, said Backoffice capable of communication with said satellite communications network and a public switched telephone network or a packet network;
> said Backoffice processor configured to: (1) associate said satellite communications emulator with said mobile cellular enabled device in said Backoffice database and (2) to send notification to said mobile cellular enabled device's home location registry of the status of said mobile cellular enabled device as a roaming device on said Backoffice when said Backoffice processor receives a communication from said mobile cellular enabled device requesting communication service through said satellite communications emulator, and (3) to send to said mobile cellular enabled device's home location registry a mobile station routing number or an internet protocol (IP) address associated with the satellite communications emulator.

\* \* \* \* \*